US005568036A

United States Patent [19]

Hulsey et al.

[11] Patent Number: 5,568,036
[45] Date of Patent: Oct. 22, 1996

[54] CONTACTLESS BATTERY CHARGING SYSTEM WITH HIGH VOLTAGE CABLE

[75] Inventors: Stephen J. Hulsey, Los Angeles; George R. Woody, Redondo Beach; Ray G. Radys, Santa Monica, all of Calif.

[73] Assignee: Delco Electronics Corp., Kokomo, Ind.

[21] Appl. No.: 348,663

[22] Filed: Dec. 2, 1994

[51] Int. Cl.$^6$ ................................................. H01M 10/46
[52] U.S. Cl. ................................................. 320/2; 333/12
[58] Field of Search ................................. 320/2; 333/12

[56] References Cited

U.S. PATENT DOCUMENTS

| | | | |
|---|---|---|---|
| 2,708,719 | 5/1955 | Roach | 333/12 |
| 5,157,319 | 10/1992 | Klontz et al. | 320/2 |
| 5,216,402 | 6/1993 | Carosa | 336/66 |
| 5,301,096 | 4/1994 | Klontz et al. | 363/37 |
| 5,323,099 | 6/1994 | Bruni et al. | 320/2 |
| 5,327,065 | 7/1994 | Bruni et al. | 320/2 |
| 5,341,281 | 8/1994 | Skibinski | 363/39 |
| 5,461,299 | 10/1995 | Bruni | 320/2 |

FOREIGN PATENT DOCUMENTS

WO94/09544 10/1993 WIPO .............. H02J 7/00

OTHER PUBLICATIONS

1991 IEEE Industry Applications Society Annual Meeting, 28 Oct. 1991–1 Nov. 1991 Dearborn, pp. 1263–1269, XP 000299576 Klontz et al.

Primary Examiner—Peter S. Wong
Assistant Examiner—Patrick B. Law
Attorney, Agent, or Firm—Mark A. Navarre

[57] ABSTRACT

A high voltage cable system for use with a contactless battery charging system that charge propulsion batteries of an electric vehicle, and the like. The contactless battery charging system includes a primary power converter coupled to a power source and a secondary power converter located on the electric vehicle that is coupled propulsion batteries of the electric vehicle. The primary and secondary power converters are connected by way of a coaxial power cable. An isolation transformer is coupled between the output of the primary power converter and the coaxial power cable. This transformer allows one of the two outputs of the primary power converter to be connected to ground potential. The isolation transformer improves the safety and reduces electromagnetic interference (EMI) when coupling power to the secondary power converter. The isolation transformer 30 allows for the use of a stepped-up voltage level to be used in the primary power converter, which reduces the amount of current in the coaxial power cable required to deliver power to the secondary converter. This allows a much higher charge power to be delivered to the electric vehicle using a reasonably sized coaxial power cable.

5 Claims, 1 Drawing Sheet

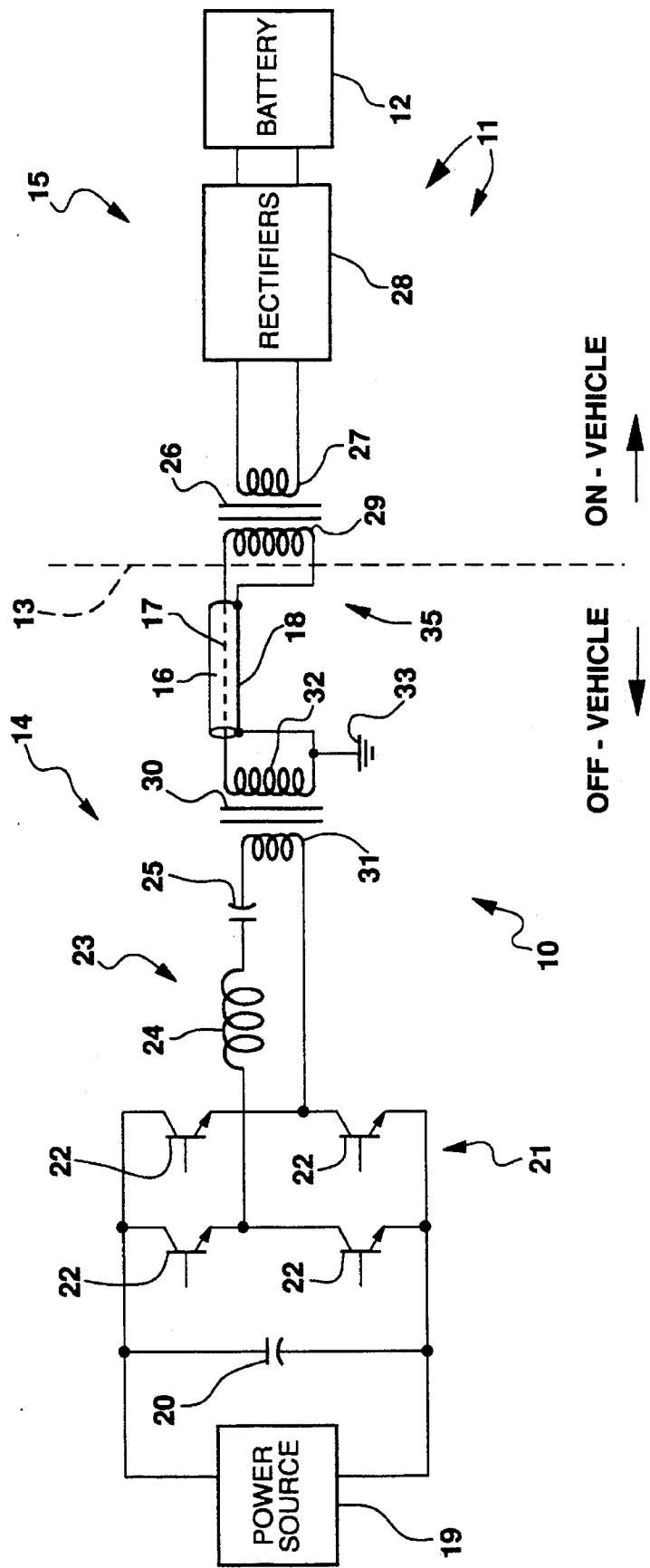

CONTACTLESS BATTERY CHARGING SYSTEM WITH HIGH VOLTAGE CABLE

BACKGROUND

The present invention relates to battery charging systems, and more particularly, to a high voltage cable system for use with contactless battery charging systems.

The prior art relating to the present invention is disclosed in U.S. Pat. No. 5,157,319 entitled "Contactless Battery Charging Systems". In this patent a charging system has a power source that is coupled by way of a primary converter which transfers power through a charge port transformer to a secondary converter. The primary converter drives a cable that is coupled to the secondary converter from a full transistor bridge primary converter through a series resonant tank. The voltage in the cable is limited to the voltage that powers the transistor bridge. If a coaxial cable is used, the cable return has large dv/dt. This generates a large amount of electromagnetic interference (EMI) which is difficult to shield. The present invention eliminates these disadvantages.

Therefore, it is an objective of the present invention to provide for a high voltage cable system for use with contactless battery charging systems that eliminates the disadvantages of conventional cabling arrangements.

SUMMARY OF THE INVENTION

In order to meet the above and other objectives, the present invention is a high voltage cable system for use with contactless battery charging systems that charge electric vehicles, and the like. The contactless battery charging system includes a high frequency primary power converter that is coupled to a power source and that is located external to the electric vehicle, and a secondary power converter, known as a charge port, located on the electric vehicle that is coupled a propulsion battery or batteries of the electric vehicle. The primary and secondary converters are connected by way of a power cable.

In accordance with the present invention, an isolation transformer is added at the output of the high frequency primary converter that is coupled to a coaxial power cable. This transformer allows one of the two outputs of the high frequency primary power converter to be connected to ground potential.

The use of the isolation transformer eliminates the disadvantages of conventional cable arrangements. The isolation transformer provides improved safety and reduces electromagnetic interference (EMI) when driving the coaxial power cable connected between output of the isolation transformer and the charge port transformer located on the electric vehicle to couple power to the secondary converter.

The use of the present isolation transformer also allows for the use of a stepped-up voltage level to be used in the primary converter. This reduces the amount of current in the cable when delivering power to the secondary converter in the electric vehicle. This allows a much higher charge power to be delivered to the electric vehicle using a reasonably sized cable. The high level voltage transferred through the cable is stepped down to the required battery charging voltage by increasing the number of primary turns in the transformer in the secondary converter or charge port.

The present invention increases safety, reduces EMI, and reduces the cable size required to transfer a given amount of charge power to electric vehicles utilizing contactless battery charging systems such as are disclosed in U.S. Pat. No. 5,157,319. The present invention may be used with electric vehicle battery recharging systems manufactured by the assignee of the present invention for use in charging electric vehicles.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which the sole drawing illustrates high voltage cable system in accordance with the principles of the present invention for use with contactless battery charging systems, and the like.

DETAILED DESCRIPTION

Referring to the drawing figure, it illustrates a high voltage cable system 10 for use with a contactless battery charging system 11 that charges a propulsion battery 12 or batteries 12 of an electric vehicle 13, for example. The contactless battery charging system 11 includes a primary power converter 14 that is coupled to a power source 19 (typically providing an output voltage on the order of 208 VAC) and that is located external to the electric vehicle 13. A secondary power converter 15, also referred to as a charge port 15, is disposed on the electric vehicle 13 and is coupled to the propulsion batteries 12 of the electric vehicle 13. The primary and secondary power converters 14, 15 are connected by way of a coaxial power cable 16 having a central conductor 17 and a ground return 18.

The primary power converter 14 is comprised of a filter capacitor 20, a transistor bridge 21 comprising four field effect transistors 22, for example, that is coupled by way of a series resonant tank circuit 23 comprising an inductor 24 and a capacitor 25 to a primary winding 31 of an isolation transformer 30 in accordance with the present invention. The isolation transformer 30 has a predetermined step up turns ratio to increase the voltage and lower the current in the coaxial power cable 16. A secondary winding 32 of the isolation transformer 30 is coupled to a first end of the coaxial power cable 16. One side of the secondary winding 32 of the isolation transformer 30 is connected to chassis ground 33 to ground the ground return 18 of the coaxial power cable 16.

The secondary power converter 15 is comprised of a secondary transformer 26 that comprises the charge port 15 for the electric vehicle 13. A secondary winding 27 of the secondary transformer 26 is coupled by way of rectifiers 28 to the propulsion batteries 12 of the electric vehicle 13. The second end of the coaxial power cable 16 forms a charge probe 35 that comprises a primary winding 29 of the secondary transformer 26.

In operation, the transistor bridge 21 (Q1–Q4) produces a square wave power drive signal that is coupled through the series resonant tank circuit 23 (L1, C1) to the primary winding 31 of the isolation transformer 30 (T1). The step up turns ratio of the isolation transformer 30 (T1) increases the voltage and lowers the current in the coaxial power cable 16 that couples the power drive signal to the secondary transformer 26 (T2) in the charge port 15. The secondary transformer 26 (T2) then steps down the voltage as required for charging the propulsion batteries 12. One side of the secondary winding 32 of the isolation transformer 30 (T1) is connected to chassis ground so that the ground return 18 of the coaxial power cable 16 is at ground potential. This insures that the ground return 18 of the coaxial power cable 16 has no signal voltage to contribute to electromagnetic interference (EMI). The present invention thus increases safety, reduces EMI, and reduces the size of the coaxial power cable 16 required to transfer a given amount of charge power to the electric vehicle 13 utilizing the contactless battery charging system 11.

Thus there has been described a new and improved high voltage cable system for use with a contactless battery charging system 10 that reduces electromagnetic interference, permits the use of an increased level charge power to be delivered to the electric vehicle using a reasonably sized cable, and reduces the amount of current in the cable when delivering power to the secondary converter in the electric vehicle.

It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A cable system for use with a battery charging system that charges a battery of an electric vehicle, wherein the battery charging system includes a primary power converter that is coupled to a power source that is located external to the electric vehicle, and a secondary power converter disposed on the electric vehicle that is coupled to the battery of the electric vehicle, and wherein the primary and secondary power converters are connected by way of a power cable, wherein the improvement comprises:

a coaxial power cable having a central conductor and a ground return;

an isolation transformer having a primary winding coupled to an output of the primary power converter and having a secondary winding coupled to the central conductor and ground return of the coaxial power cable.

2. The cable system of claim 1 wherein the isolation transformer has a predetermined step up turns ratio to increase the voltage and lower the current carried by the coaxial power cable.

3. A cable system for use with a battery charging system that charges a battery of an electric vehicle, wherein the battery charging system includes a primary power converter that is coupled to a power source that is located external to the electric vehicle, and a secondary power converter disposed on the electric vehicle that is coupled to the battery of the electric vehicle, and wherein the primary and secondary power converters are connected by way of a power cable, wherein the improvement comprises:

a coaxial power cable having a central conductor and a ground return;

an isolation transformer having a primary winding coupled to an output of the primary power converter and having a secondary winding coupled to the central conductor and ground return of the coaxial power cable, and wherein the isolation transformer has a predetermined step up turns ratio to increase the voltage and lower the current carried by the coaxial power cable.

4. A cable system for use with a battery charging system that charges a battery of an electric vehicle, wherein the battery charging system includes a primary power converter coupled to a power source located external to the electric vehicle, and a secondary power converter disposed on the electric vehicle that is coupled to the battery of the electric vehicle, wherein the primary power converter is comprised of a transistor bridge that is coupled to a series resonant tank circuit, and wherein the secondary power converter is comprised of a secondary transformer that is coupled by way of rectifiers to the battery of the electric vehicle, and wherein the primary and secondary power converters are connected by way of a power cable, wherein the improvement comprises:

a coaxial power cable having a central conductor and a ground return;

an isolation transformer having a primary winding coupled to the transistor bridge of the primary power converter and having a secondary winding coupled to the central conductor and ground return of the coaxial power cable.

5. The cable system of claim 4 wherein the isolation transformer has a predetermined step up turns ratio to increase the voltage and lower the current carried by the coaxial power cable.

* * * * *